Sept. 13, 1955
L. H. SAVAGE
2,717,797
LATCH MECHANISM
Filed Jan. 27, 1951
2 Sheets-Sheet 1
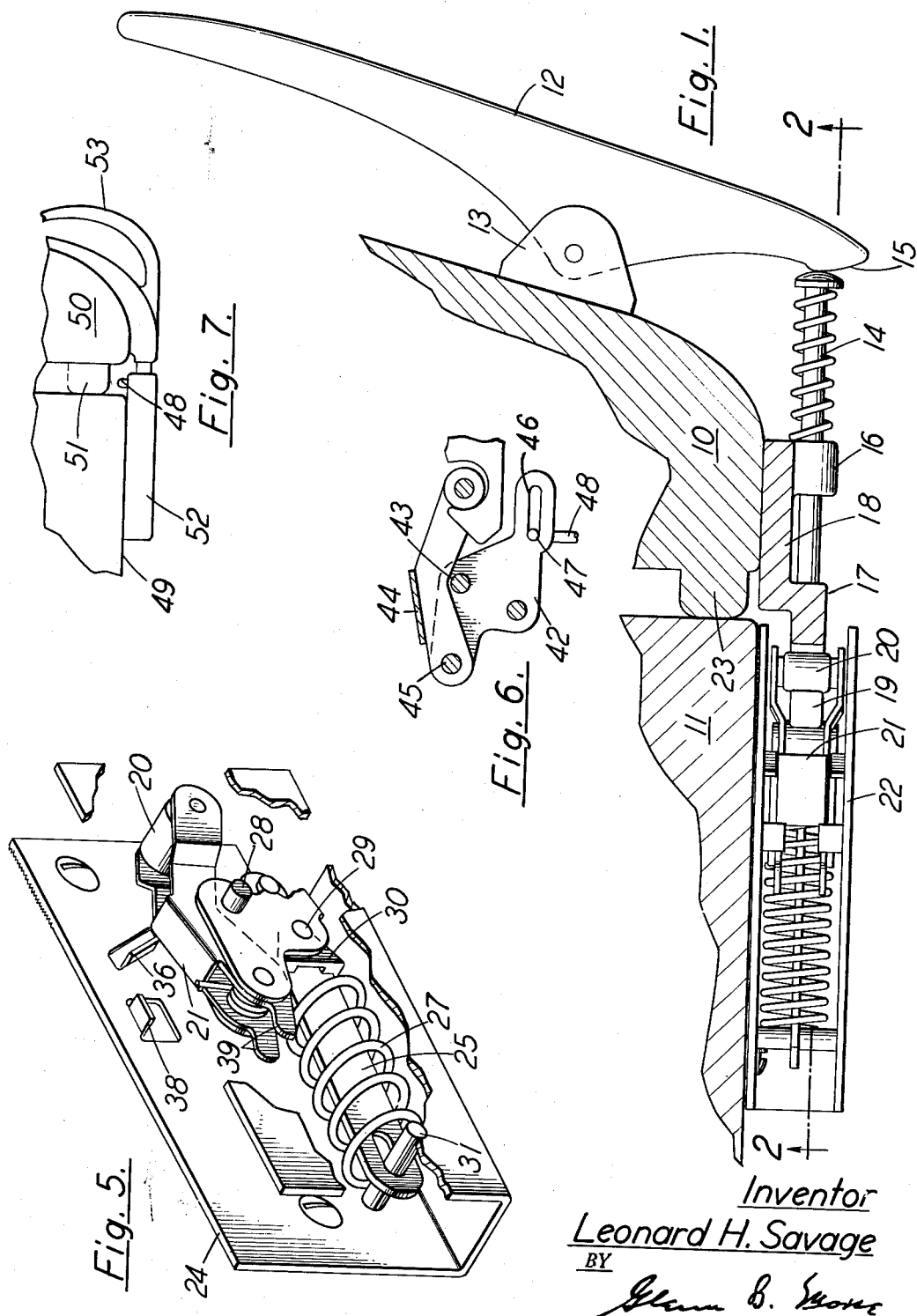
Inventor
Leonard H. Savage
BY
Glenn B. Moore
Attorney Sept. 13, 1955      L. H. SAVAGE      2,717,797
LATCH MECHANISM
Filed Jan. 27, 1951      2 Sheets-Sheet 2
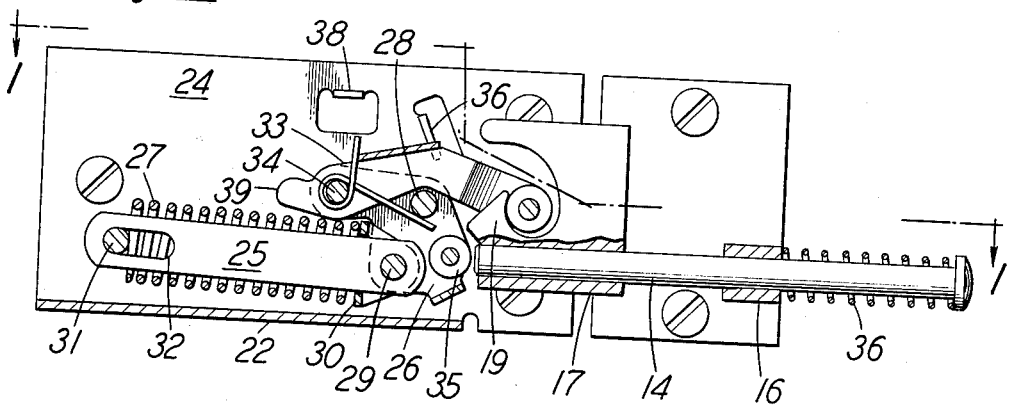
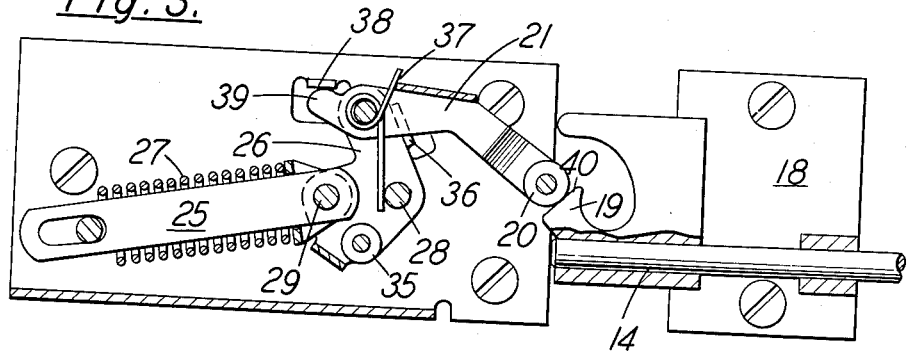
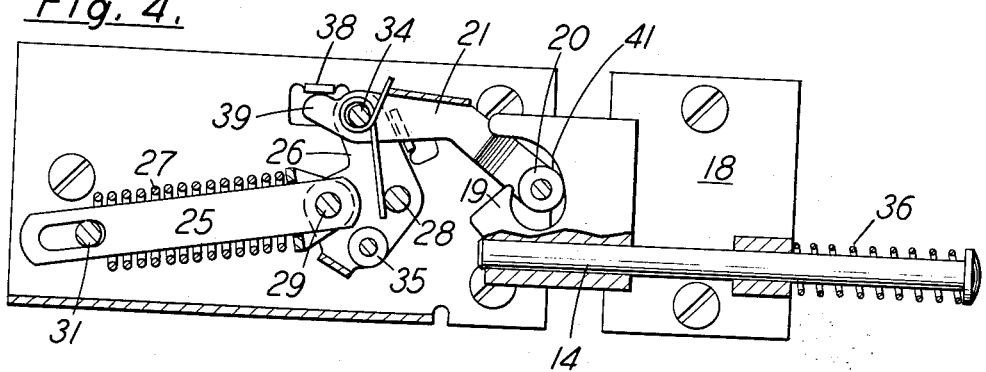
Inventor
Leonard H. Savage
BY
Glenn B. Moore
Attorney

United States Patent Office 2,717,797
Patented Sept. 13, 1955

2,717,797
LATCH MECHANISM

Leonard H. Savage, Grandville, Mich., assignor to Crampton Manufacturing Company, a corporation of Michigan Application January 27, 1951, Serial No. 208,181

3 Claims. (Cl. 292—332)

The present invention is associated with latch mechanisms of the type usually installed on refrigerators. These devices not only have the ability to secure a door in closed position, but also are adapted to apply a closing force to the door over a considerable stroke in order to securely engage a sealing gasket. This application of closing force, or "pull-down," usually takes place over a stroke of approximately one-eighth to one-quarter of an inch in a conventional latch mechanism after the bolt has engaged the keeper. The greater the amount of this stroke, the greater are the allowable tolerances of installation; and the greater the amount of the closing force over this stroke, the more secure is the engagement of the sealing gasket to prevent flow of air to or from the interior of the refrigerator. The pull-down effect is obtained in the present invention by the use of a toggle-action biasing system so arranged that the "line-of-centers" position corresponds roughly to the cocked or open position of the latch mechanism. The locked position of the toggle finds the central pivot point of the toggle considerably displaced from the line-of-centers, resulting in application of the greatest amount of force to the bolt at this time. The employment of toggle mechanisms as such to accomplish this broad purpose is not new, but the present invention utilizes this toggle system in cooperation with other components, creating a locking action not to be found in the prior art.

The toggle system referred to above operates to bias a crank to which a bolt is pivotally connected. With regard to ordinary mechanical terminology, this bolt may properly be described as having the action of a link associating the crank with the hook portion of a keeper. The keeper is preferably mounted on the door of the refrigerator, and the bolt-positioning mechanism is then secured to the box. In this manner, a double-toggle effect is achieved, with the second toggle system involving the crank, the link-shaped bolt, and the keeper. It is noteworthy that as the biasing toggle departs from the line-of-centers position, the second toggle involving the bolt approaches a line-of-centers. This combination of oppositely-acting toggles creates a tremendous locking force for a given amount of direct spring action on the biasing toggle. It will also give a locking effect that is very stable and capable of withstanding tremendous shocks without disturbing the closed position of the door.

The pivotal connection of the bolt on the crank permits an auxiliary bolt spring to be used which is independent of the main biasing system. This arrangement permits the bolt to be very lightly biased toward a position to engage the hooked portion of the keeper, and a suitable outer cam surface on the keeper will cause the bolt to move over the hooked portion with a minimum of effort due to the lightness of the independent bolt spring. This system gives a minimum of disturbance to the closing of the door, resulting in minimizing the closing force required to engage the latch mechanism. A secondary or inner cam surface on the keeper is adapted to operate a trigger mechanism; and the triggering effect is achieved by forces applied directly to the bolt rather than to auxiliary trigger members.

The bolt-positioning mechanism (together with the keeper) provided by the present invention may be mounted on the outside of the refrigerator. This mounting arrangement removes the necessity of providing expensive cut-outs in the door and box structure, and also minimizes the difficulty of assembling the various components to the structure. With the fastenings all exteriorly-available, the attachment and alignment of the components is accomplished with the minimum of difficulty from interference with surrounding parts and structure. The mounting of the bolt-positioning mechanism on the fixed or body portion of the refrigerator also permits the use of a pedal-operated actuating system in which a tension rod may be positioned along the groove normally existing between the closed door of the refrigerator and the body alongside the sealing gasket. Positioning the actuating rod in this area is made possible by the features of the present invention, and further simplifies the intallation due to the removal of the necessity of concealing the rod or providing passages and cut-out portions to permit the insertion and operation of this member.

The advantages of mounting the keeper on the door of the refrigerator include making available a considerable amount of relatively heavy structure which can be utilized to provide bearings and supports for the cocking and uncocking mechanism operated in conjunction with the handle. A latch mechanism embodying the present invention can be released through forces applied by a plunger carried in bearing surfaces provided by the keeper and operating against a portion of the aforementioned crank. The positioning of this push rod does not require elaborate auxiliary structure due to the presence of the heavy member of which the keeper is an integral part.

The features of the present invention will be discussed in detail by an analysis of the particular embodiments illustrated in the accompanying drawings. In these drawings:

Figure 1 is a section taken on a horizontal plane, through the bolt-positioning mechanism, the keeper, and a portion of the door and body of a refrigerator.

Figure 2 is a section taken on the plane 2—2 of Figure 1, and presenting a section on a vertical plane of the latch mechanism in a closed position.

Figure 3 is a section similar to Figure 2, but showing a latch mechanism as the door approaches closed position and with the bolt roller at point of first contact with the outer cam surface of the keeper.

Figure 4 is another section similar to Figure 2, in which the latch mechanism is in a position corresponding to the point at which the triggering action has just been begun (the door is not quite fully closed).

Figure 5 presents a perspective view of the bolt-positioning mechanism, with parts of the housing broken away to clarify the relationship of the various components.

Figure 6 is a view of a portion of a modified form of the present invention adapted for the use of a pedal actuator.

Figure 7 is a view taken on a horizontal plane of an arrangement utilizing the mechanism illustrated in Figure 6, and showing the general position of the pedal actuating rod.

Referring to Figure 1, a door 10 is shown in closed position with respect to the body portion 11 of a refrigerator. A handle 12 is pivotally attached to the door 10 on the bracket 13. Operation of the handle causes axial movement of the push rod 14 due to the action of the cam 15, the push rod 14 having sliding movement within bearings 16 and 17 provided by the "strike," or keeper unit 18. The hooked portion 19 of the keeper is engaged by the bolt roller 20, and the bolt 21 is positioned by the bolt-positioning mechanism generally indicated at 22. The operation of the device causes the door 10 to be held securely in the closed position, and also creates a closing force to compress the sealing gasket 23 sufficiently to adequately seal the door against inflow or outflow of air.

Referring to Figures 2 through 5, inclusive, the bolt-positioning mechanism 22 includes the housing 24, and a biasing toggle system including the arm 24 and the crank 26. The biasing effect of the toggle system originates in the spring 27 surrounding the arm 25. The crank 26 is pivotally connected to the housing 24 at the point 28, and the arm 25 is pivotally connected to the crank at the point 29. A member 30 is mounted on the same pin which provides the pivotal connection at 29, and acts as a spring seat against which the spring 27 can operate. The opposite end of the spring bears against the pin 31 secured to the housing 24, the arm 25 having sliding engagement with this pin at the slot 32. The details of this toggle system are not new per se, and other well-known equivalent mechanisms may be substituted for it. Its important characteristic is the provision of a force vector having a limited change of position and directed at a particular point on a rotatably mounted member, remote from the axis of rotation.

A bolt arm 33 is pivotally mounted upon the crank 26 at the point 34, and the bolt 21 thus acts as a link connecting this pivotal mounting with the hooked-shaped portion 19 of the keeper. A counterclockwise rotation of the crank about its pivot point 28 will generate a toggle action including the crank 26, the bolt 21, and the keeper 19. Since the hinge axis of the door 10 establishes a line of movement of the hook portion 19, these components act as a toggle as the bolt-positioning mechanism approaches the closed position shown in Figure 2.

To release the latch, the handle 12 is pulled causing an inward movement of the push rod 14 within the bearings 16 and 17 provided by the keeper unit. This inward movement eventually causes the inner end of the rod 14 to come in contact with the roller 35; and further movement of the push rod causes a clockwise rotation of the crank to a point where the pivot connection 29 passes across the line-of-centers between the pin 31 and the axis of rotation 28 of the crank. A return spring 36 causes the push rod to resume its original position shown in Figure 2. As the pivot connection 29 passes across the line-of-centers, the biasing effect provided by the spring 27 and its associated toggle system causes the bolt-positioning mechanism to snap into the position shown in Figure 3. Further clockwise movement of the crank is obstructed by the stop 36, and the positioning of the bolt is accomplished by the joint effect of the independent bolt spring 37, the abutment 38, and the extension 39 formed integrally with the bolt 21. As the spring 37 biases the bolt in a clockwise direction, such movement is prevented by the engagement of the extension 39 and the abutment 38. This arrangement permits the bolt to be rotated in a counterclockwise direction by the action of the outer cam surface 40 of the keeper against the cam roller 20, this movement taking place against the spring 37. Figure 3 shows a mechanism at the point of first contact of the roller 20 with the outer cam surface 40, and further closing movement of the door causes the roller to climb over the hook portion 19. The free position of the bolt determined by the spring 37, the abutment 38, and the extension 39 places the axis of the roller 20 above the center of curvature of the tip of the hook portion 19, so that the door of the refrigerator may be pulled open when the bolt-positioning mechanism is cocked as shown in Figure 3. The bolt roller is therefore able to climb over the hook portion 19 from either direction when the mechanism is cocked.

After the door has moved inwardly a sufficient amount to permit the roller 20 to fall in behind the hooked portion 19, a further inward movement of the door brings the inner cam surface 41 into engagement with the roller 20. The effect of this inner cam surface is to apply a downward force to the roller tending to cause a clockwise rotation to the bolt 21. This clockwise rotation is resisted by the engagement of the extension 39 and the abutment 38; and as a result of this action, prying forces are generated which cause a counterclockwise movement of the crank 26. This prying action continues over a sufficient stroke to cause the point 29 to move across the line-of-centers between the pin 31 and the pivot point 28 of the crank. As this line-of-centers is passed, the bolt-positioning mechanism then acts under the biasing effect of the spring 27 and its associated toggle mechanism, and snaps into the position shown in Figure 2. This closing action involves the double toggle effect of the biasing system (including the spring 27, the arm 25, and the crank 26), and the secondary toggle provided by the crank 26, the bolt 21, and the structure associated with the keeper unit 18. It will be noted that as the biasing toggle system passes from the position shown in Figure 4 to that shown in Figure 2, it departs further from the line-of-centers; while the pivot point 34 of the secondary toggle approaches a line-of-centers defined by the hooked portion 19 and the crank pivot point 28. In this manner, the net closing force of the mechanism is tremendously increased at precisely the point at which it is most needed.

Referring to Figure 6, a modified form of the present invention is shown in which a different type of actuation is utilized in order to release the bolt-positioning mechanism. A crank 42 is similar in function to the crank 26 shown in Figures 1 through 5. It is pivotally mounted on the pin 43, and carries a bolt 44 pivotally mounted at the pin 45. In place of the roller 35, however, the crank 42 is provided with a slot 46 which is engaged by the horizontal end 47 of the generally vertical actuating rod 48. A downward pull of the rod 48 causes the crank 42 to rotate in a clockwise direction to the released position. Figure 7 shows the relationship of the rod 48 and the refrigerator structure. The body portion 49 is separated from the door 50 by the sealing gasket 51, leaving a groove-shaped space within which the rod 48 may operate without presenting an unsightly appearance. The bolt-positioning mechanism 52, except for the modification indicated in Figure 6, is generally similar to that indicated in Figures 1 through 5. The door 50 may be provided with a fixed handle 53 simply to aid in swinging the door open.

The particular embodiments illustrated in the accompanying drawings and discussed herein are for illustrative purposes only and are not to be considered as a limitation upon the scope of the appended claims. In these claims it is the intent of the inventor to claim the entire invention to which he is entitled in view of the prior art.

I claim:

1. A latch mechanism for a container having strike means and a door, comprising: frame means; crank means rotatably mounted in said frame means; biasing means for said crank means adapted to apply torque to said crank means, said crank biasing means including spring means adapted to apply force to a point on said crank means and directed principally toward the axis of the rotatable mounting of said crank means; stop means limiting the movement of said crank means at a position wherein the direction of force applied by said spring means passes adjacent to said axis; bolt means pivotally connected to said crank means at a point whereat rotation of said crank means away from said stop means accompanies strike engaging movement of said bolt means, said bolt means having strike-engaging means adapted to be displaced by engagement with said strike means and transmitting resulting movements through said bolt means to the pivot connection between said bolt means and said crank means; bolt-positioning means including an abutment on said frame means adapted to limit the rotation of said bolt means about its axis of pivotal connection to said crank means when said crank means is positioned by said stop means and also including biasing means urging said bolt means toward said abutment, said bolt-positioning means establishing an extended position of said bolt means for disengagement from said strike means; means forming a cam surface fixed with respect to said strike means and disposed to contact said strike-engaging means, and adapted to urge said bolt means against said abutment and said strike-engaging means into position to engage said strike means on closing said door whereby said crank means is rotated away from said stop means; and cocking means including a member engageable with said crank means when said door is closed to rotate said crank means toward said stop means.

2. A latch mechanism for a container having strike means and a door, comprising: frame means; crank means rotatably mounted in said frame means; biasing means for said crank means adapted to apply torque to said crank means, said crank biasing means including spring means adapted to apply force to a point on said crank means and directed principally toward the axis of the rotatable mounting of said crank means; stop means limiting the movement of said crank means at a position wherein the direction of force applied by said spring means passes adjacent to said axis; bolt means pivotally connected to said crank means at a point whereat rotation of said crank means away from said stop means accompanies strike engaging movement of said bolt means, and at the same time approaches in locking condition a line-of-centers position with respect to said strike means and the axis of rotatable mounting of said crank means, on the opposite side of said axis from said strike means, said bolt means having strike-engaging means adapted to be displaced by engagement with said strike means and transmitting resulting movements through said bolt means to the pivot connection between said bolt means and said crank means; bolt-positioning means including an abutment on said frame means adapted to limit the rotation of said bolt means about its axis of pivotal connection to said crank means when said crank means is positioned by said stop means, and also including biasing means urging said bolt means toward said abutment, said bolt-positioning means establishing an extended position of said bolt means for disengagement from said strike means; and cocking means including a member engageable with said crank means when said door is closed to rotate said crank means toward said stop means.

3. A latch mechanism for a container having strike means and a door, comprising: frame means; crank means rotatably mounted in said frame means; biasing means for said crank means adapted to apply torque to said crank means, said crank biasing means including spring means adapted to apply force to a point on said crank means and directed principally toward the axis of the rotatable mounting of said crank means; stop means limiting the movement of said crank means at a position wherein the direction of force applied by said spring means passes adjacent to said axis; bolt means pivotally connected to said crank means at a point whereat rotation of said crank means away from said stop means accompanies strike engaging movement of said bolt means, and at the same time approaches in locking condition a line-of-centers position with respect to said strike means and the axis of rotatable mounting of said crank means, on the opposite side of said axis from said strike means, said bolt means having strike-engaging means adapted to be displaced by engagement with said strike means and transmitting resulting movements through said bolt means to the pivot connection between said bolt means and said crank means; and cocking means including a member engageable with said crank means when said door is closed to rotate said crank means toward said stop means.

References Cited in the file of this patent

UNITED STATES PATENTS

| Number | Name | Date |
|---|---|---|
| 419,881 | Proctor | Jan. 21, 1890 |
| 1,634,013 | Boucek | June 28, 1927 |
| 1,937,978 | Miller | Dec. 5, 1933 |
| 2,044,500 | Geske et al. | June 16, 1936 |
| 2,385,961 | Anderson | Oct. 2, 1945 |
| 2,451,381 | Curtiss | Oct. 12, 1948 |
| 2,525,019 | Doherty | Oct. 10, 1950 |
| 2,558,233 | Burke | June 26, 1951 |
| 2,561,201 | Hogg | July 17, 1951 |